US008630417B2

(12) United States Patent
Burckard et al.

(10) Patent No.: US 8,630,417 B2
(45) Date of Patent: Jan. 14, 2014

(54) METHOD FOR RECORDING AND RESTORING A CIPHERED CONTENT BY A PROCESSING UNIT

(75) Inventors: Antoine Burckard, Montigny le Bretonneux (CH); Sebastien Robyr, Epalinges (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1449 days.

(21) Appl. No.: 12/323,652

(22) Filed: Nov. 26, 2008

(65) Prior Publication Data

US 2009/0138701 A1  May 28, 2009

(30) Foreign Application Priority Data

Nov. 27, 2007 (EP) ..................................... 07121610

(51) Int. Cl.
*H04L 9/00* (2006.01)
(52) U.S. Cl.
USPC ............................ 380/277; 380/262; 380/264
(58) Field of Classification Search
USPC ........................................ 380/277, 262, 264
See application file for complete search history.

(56) References Cited

U.S. PATENT DOCUMENTS

| 5,319,705 A * | 6/1994 | Halter et al. ..................... 705/54 |
| 7,181,624 B2 | 2/2007 | Asano et al. |
| 2004/0010467 A1 * | 1/2004 | Hori et al. ....................... 705/50 |

FOREIGN PATENT DOCUMENTS

WO            00/56068            9/2000

\* cited by examiner

*Primary Examiner* — Ashok Patel
*Assistant Examiner* — Lawrence Cosby
(74) *Attorney, Agent, or Firm* — DLA Piper LLP US

(57) ABSTRACT

A method of operating by a second processing unit a content recorded by a first processing unit, said first and second processing units having a specific key being managed by a central server. The processing units have access to a removable storage memory intended to record a content ciphered by a content key accompanied by a file associated to the content. The content key is produced by means of a cascaded deciphering starting from the specific key of the first unit of at least two constants provided by the central server and a variable. The content is restored by the second processing unit by means of a cascaded deciphering starting from the specific key of the second unit by using the constants and the variable stored in the file accompanying the content and a transcoding key calculated by the central server.

15 Claims, 2 Drawing Sheets

METHOD FOR RECORDING AND RESTORING A CIPHERED CONTENT BY A PROCESSING UNIT

FIELD OF THE INVENTION

The present invention relates to the field of units processing ciphered digital data of audio/video contents. These units are implemented in different multimedia equipment as for example personal computers, mobile equipments or digital pay television decoders. They are generally associated to removable or external storage memories such as hard discs, optical discs, cards, modules or any other kind of mass memory intended to record contents in the aim to restore them subsequently.

TECHNICAL BACKGROUND

The unlimited recording and restoring of contents opens the possibility for an abusive use of these contents that are generally protected by copyright. Many protection and control means for restoring contents have been developed as shown in the examples below.

The document EP1169856B1 describes a method of accessing an encrypted content. The latter is protected in a local network by the re-ciphering of the key required for the decryption of the content. A first unit receives and stores the encrypted data content and encrypts the decryption key of the data with a key specific to this first unit. The data and the encrypted key are transmitted to a second unit belonging to the network for their decryption. According to an embodiment, the key associated to the first unit is a public key whose corresponding private key is located in the second unit.

The document U.S. Pat. No. 7,181,624 describes a device for recording and reproduction of digital data broadcast in a transport stream. The device appends temporal data indicating the arrival time to each data packet included in the transport stream. A block key is generated to encrypt a data block including several transport packets each accompanied with the arrival time temporal data of the packets. This key is created from a root block comprising additional information unique to the data block including the arrival time temporal data and encrypts each data block. The digital data thus encrypted are stored in the device memory. The reproduction of data is carried out according to a decryption process inverse to that of the encrypting during the recording.

The document US2004010467 describes a memory card for mobile equipment comprising a memory zone intended to store encrypted data content, a zone to store license data transmitted by a distribution system, a plurality of zones for storing authentication data authenticated by public keys common to the distribution system. In response to a distribution request coming from the mobile equipment, a license server verifies the authenticity of the memory card and distributes the encrypted content and the corresponding license to the mobile equipment. An encrypted content received by first mobile equipment can be transferred to second mobile equipment able to exploit the content only if the corresponding license has been acquired. Therefore the second equipment will have to obtain the license comprising a decryption key of the content from the distribution system which will verify the conformity of the memory card.

SUMMARY OF THE INVENTION

The aim of the present invention is to provide an improvement of the protection against excessive copies of contents recorded in a storage memory which can be transferred from one processing unit to another.

This aim is reached by a method of operating by a second processing unit a content recorded by a first processing unit, said first and second processing units having each a specific key being managed by a central server, the processing units having access to a removable storage memory intended to record the content ciphered by a content key and also data associated to said content, the content key being produced according to the following steps a to d or d':

a) deciphering, by the key specific to the first processing unit, a first constant provided by the central server for obtaining a first local key, b) deciphering a second constant provided by the central server with the first local key, obtaining an intermediate key, c) obtaining a variable by the first processing unit, d) ciphering the contents with a content key obtained by deciphering the variable with the intermediate key, storing in the storage memory the ciphered content, the first and second constants and the variable, or d') deciphering the content with a content key equal to the variable, storing in the storage memory the ciphered content, the first and second constants and the variable ciphered with the intermediate key, the method is characterized in that the content ciphered with the content key produced according to steps a, b, c and d or d' is restored by the second processing unit, the following steps being previously carried out by the central server:

1) obtaining the first local key by the central server, this key being such that when ciphered by the key specific to the first processing unit, the first constant is obtained, 2) obtaining a second local key by the central server, this key being such that when ciphered by the key specific to the second processing unit, the first constant is obtained, 3) calculation of a transcoding key by deciphering the second constant by the first local key then by ciphering the result by the second local key, 4) sending the transcoding key to the second processing unit, and according to the following steps carried out by the second processing unit, A) deciphering by the key specific to the second processing unit, of the first constant provided for obtaining the second local key, B) deciphering the transcoding key with the second local key, to obtain the intermediate key, C) deciphering the variable by the intermediate key to obtain the content key, D) deciphering the content with the content key and restoring this content by the second processing unit.

The method presents the main advantage of not exposing the keys specific to processing units by their transmission to the central server or their storage in the removable memories. Keys, constants and variables used during the ciphering and the deciphering of the content derive from the keys specific to the units and knowledge of them does not allow retrieval of these specific keys. Only the concerned units and units known by the central server can exploit this data associated to the content for the ciphering/deciphering operations during the recording and restoration of the content.

The operations of steps a, b, c, d or d' of producing the content key during the recording of the content by the first unit and the operations of steps A to C for obtaining the content key during the restoration of the content by the second unit are preferably carried out by the respective chipsets of the first and the second unit. A chipset is a set of electronic circuitry allowing the processor to manage data exchanges between the different components of the unit. The execution of these operations at the chipsets level of units aims to prevent all material attack consisting of analyzing the exchanged signals in order to discover the keys specific to the units used by them. Thereby, the specific key, the local key and the intermediate key are not accessible outside the chipset. The ciphering/deciphering module will also be located in the same chipset so that the content key will also not be accessible from outside.

It should be noted that deciphering operations of steps a), b) and d) during the recording of the content, deciphering/ciphering during the calculation of the transcoding and deciphering key of steps A), B) and C) during the restoration of the content can be replaced by ciphering operations respectively ciphering/deciphering operations.

BRIEF DESCRIPTION OF THE DRAWINGS

The invention will be better understood thanks to the following detailed description that refers to the herewith enclosed figures given as non limitative examples.

DETAILED DESCRIPTION OF THE INVENTION

The method of the invention is applied for instance to units processing audio/video contents such as decoders (set top boxes) of Pay-TV programs. Each one of these units is generally associated to a security module. The latter is a well-known tamper-proof device containing various ciphering/deciphering keys, data used to identify a user on a network and data defining rights acquired by the user for the reception of broadcast audio/video content. The security module may have different forms such as a removable smart card inserted in a reader, an integrated circuit welded to a mother board, a SIM type card (Subscriber Identity Module) as in almost all the mobile equipment or furthermore in the form of a software module and/or material encapsulated within a chipset.

Figure 1:
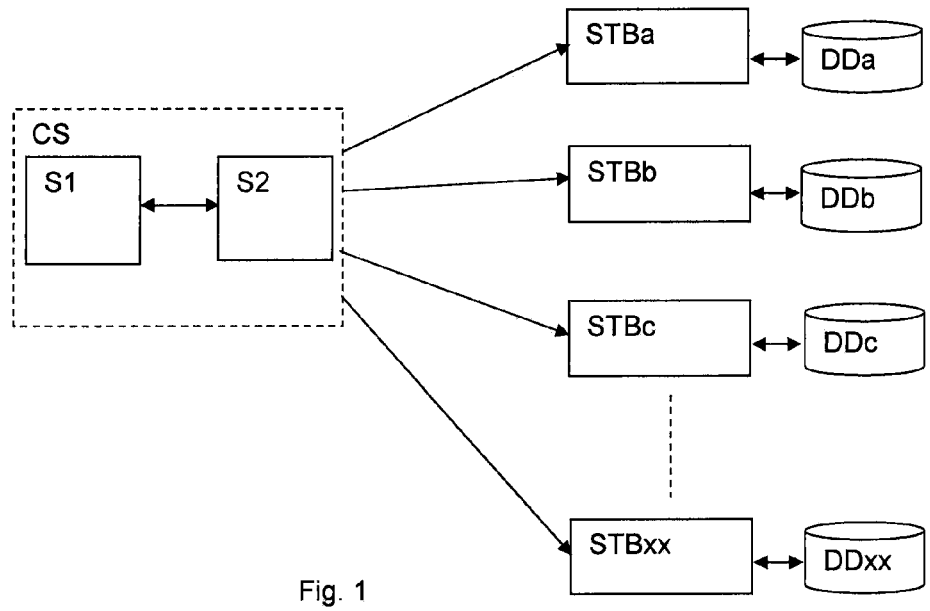
FIG. 1 shows a plurality of processing units equipped with a removable content storage memory managed by a central server.

The diagram of FIG. 1 shows units managed by a central server (head end) which are preferably equipped with external storage media such as removable hard discs and/or optical discs, non-volatile memories of flash type or others allowing the recording of program contents and their subsequently restoration. Thanks to the interchangeability of storage media, a content registered by a given unit can be reproduced by another unit managed by the same server. Of course, a content registered by a unit can also be restored by the same. The recording and restoring operations of contents are controlled by the central server that provides the parameters and keys necessary for the ciphering/deciphering of the content.

A processing unit can also consist of a mobile or fixed personal computer equipped with an internal or external security module. The external security module for instance is in the form of a smart card inserted in a reader or in the form of an electronic key (dongle) connected to the computer by means of the USB serial interface (Universal Serial Bus) or any other interface available on the computer. The unit or units are managed by a central server and they have an access to removable storage media as hard discs and/or optical discs, non-volatile memories of the flash type or others, able to record a ciphered content intended to be restored by the same unit or by a unit different from the one having recorded the content.

According to an example of configuration, the central server comprises a primary server S1 where the unique keys (Ka, Kb, ... Kxx) of units (STBa, STBb, ..., STBxx) are generated and then stored and a secondary server S2 used to calculate the keys and provide the key files necessary for the deciphering of a content recorded by a unit. During the first connection of a unit at its installation to the central server CS, the primary server S1 provides a unique key to the unit that stores it in a particular memory which is writable only once. The secondary server S2 does not store the unique keys specific to the units but only keys derived from the units' unique keys.

Figure 2:
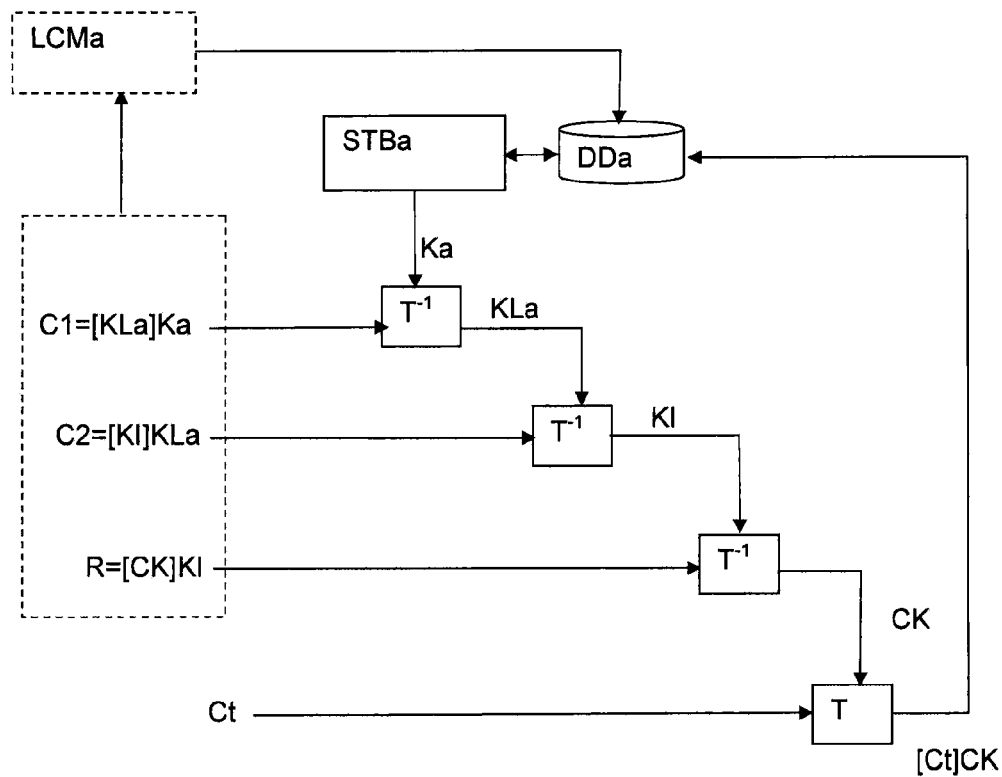
FIG. 2 shows the recording process of a content by a processing unit wherein the content is ciphered by a content key, derived from the key specific to the processing unit, generated from two constants provided by the central server and a variable generated locally.

The content recorded in the memory of the processing unit is ciphered by a content key CK resulting from a successive deciphering of two parameters provided by the central server CS represented by two constants C1 and C2 and from a variable R generated locally by the processing unit. The diagram of FIG. 2 shows the different deciphering steps carried out for obtaining a key CK able to cipher the content Ct.

In a first step, the constant C1 is deciphered by a unique key Ka specific to the processing unit STBa in order to obtain a local key KLa. The unique and invariable key Ka is stored in a read-only memory of the chipset of the unit and inaccessible from outside the chipset of the unit. The deciphering is represented in the FIGS. 2, 3 and 4 by a block marked with the symbol $T^{-1}$ and the ciphering by a block marked with the symbol T. The ciphering/deciphering is preferably carried out by using a symmetrical key algorithm of DES type (Data Encryption Standard), TDES (Triple DES), IDEA (International Data Encryption Algorithm), AES (Advanced Encryption System), etc.

According to an embodiment, each unit includes a pair of asymmetric keys whose public key is used for deciphering the first constant C1 and the corresponding private key being stored in the chipset of the unit. The public key can also be known by the central server in reference to the embodiment 1) as below.

The local key KLa obtained in the first step is then used to decipher the second constant C2 in order to obtain an intermediate key KI. This intermediate key KI is used in a last step to decipher the variable R and obtain the content key CK. Because of the use of a variable R, the content key CK will be different for each content recording and a content key cannot be deduced from a key obtained during a previous recording. Moreover, the content key CK depends on or derives from the specific key Ka of unit STBa because it results from a cascaded deciphering of subsequent parameters (C2, R) by keys resulting from a deciphering of an initial parameter C1 carried out with said specific key Ka.

The content is stored in the storage unit DDa in a form ciphered with the key CK and accompanied by a file LCMa containing the constants C1 and C2 and the variable R. This file LCMa may be ciphered by a key issued from the security module associated to the unit STBa.

According to an option, the content key CK is equal to the variable R and the file LCMa contains the variable R ciphered with the intermediate key KI so that for determining the variable R at the restoration of the content, the intermediate key KI becomes necessary.

The step d) of the above described method is then replaced by the step d' of ciphering the content by the variable R which is equal to the content key CK, and storing the ciphered content, constants C1 and C2 and the variable R ciphered with the intermediate key KI in the storage memory.

According to a further embodiment, one or more additional levels of deciphering constants or of supplementary variables can be inserted between steps b) and c) of the process of the content key CK creation. The final intermediate key KI' thus obtained is defined as being derived from the first key KI issued from the deciphering of the second constant C2. All the supplementary constants and variables are stored in the file LCMa that will be used at restoration of the content.

The variable R is preferably in the form of a random number generated by the processing unit. It can also appear in the form of a number extracted by the unit from a list stored in a memory.

According to another embodiment, the variable R can either be generated or extracted from a list stored on the central server CS and provided to the processing unit STBa.

In both embodiments, a different value of variable R is provided at each recording of a content by a unit, either the variable R is being generated randomly or taken from the list.

When the ciphered content is restored by the same unit STBa that has recorded it, the determination process of the content key CK is identical to the one implemented during the recording thanks to the file LCMa containing the required parameters (C1, C2, R). In fact, the deciphering of the constant C1=[KLa]Ka with the specific key Ka of the unit produces the local key KLa that, used to decipher the constant C2=[KI]KLa, produces the intermediate key KI serving to decipher the variable R=[CK]KI to produce the content key CK.

In the embodiment where one or more supplementary constants or variables have been used during the recording process, the successive deciphering of these constants or variables from the first constant C1 with the specific key Ka of the unit STBa produces the final intermediate key KI'. The latter will be used to decipher the variable R or successively the variables for obtaining the content key CK.

Figure 4:
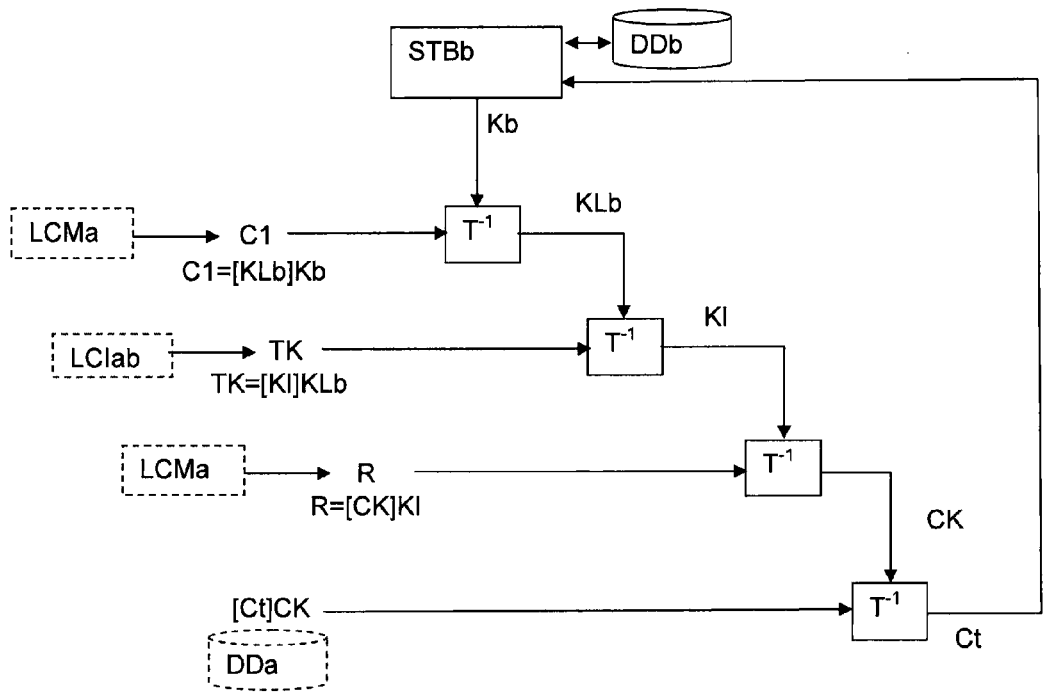
FIG. 4 shows the restoring process by a second processing unit of a content ciphered and recorded by a first processing unit wherein the content key is deciphered from the constant and the variable used during the recording and from the transcoding key created by the central server.

When the ciphered content is restored by a unit STBb different from the one that has recorded it, the process of determining the content key CK becomes more complex due to the dependence of the content key CK on the key specific of the unit that has determined it. In the example of FIG. 4, a content is recorded by a first processing unit STBa, then transferred to a second unit STBb managed by the same server CS as the first unit STBa.

The process of restoration by the second unit STBb requires the creation by the central server CS of a transcoding key TK that will be transmitted to this second unit STBb to which the ciphered content is addressed. Two embodiments can be considered:

1) The specific keys Ka, Kb . . . Kxx of units are known by the central server CS or respectively by the secondary server S2.

According to this first embodiment, the central server calculates the local key KLa from the first unit STBa by deciphering the first constant C1 with the specific key Ka of the first unit STBa.

The central server then calculates the local key KLb from the second unit STBb by deciphering the same constant C1 with the specific key Kb of the second unit STBb.

The transcoding key TK is calculated by the deciphering of the second constant C2=[KI]KLa with the first local key KLa for obtaining the intermediate key KI that will be then ciphered with the second local key KLb. The transcoding key TK=[KI]KLb thus obtained is transmitted to the second unit STBb in a transfer file LClab.

2) The specific keys Ka, Kb . . . Kxx of the units are not known by the central server CS or rather by the secondary S2 as such, but their derived local keys KLa, KLb, . . . KLxx are stored on this server S2 as the constants C1, C2.

Figure 3:
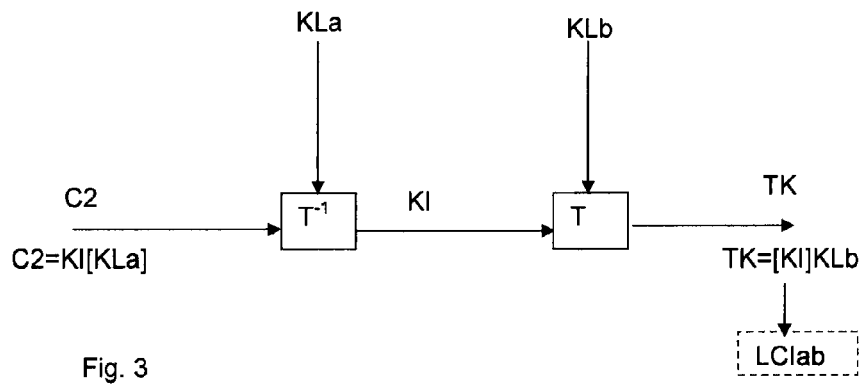
FIG. 3 shows the creation of a transcoding key carried out by the central server.

According to this second embodiment shown by FIG. 3, the central server, having at disposal the local keys KLa and KLb respectively of first and second processing unit STBa, STBb, calculates firstly the intermediate key KI by deciphering the second constant C2=KI[KLa] by the first local key KLa. Then it calculates the transcoding key TK=[KI]KLb by ciphering this intermediate key KI with the second local key KLb. The transcoding key TK=[KI]KLb is transmitted to the second unit STBb as in the first embodiment by means of the file LClab.

Thanks to the file LCMa accompanying the ciphered content and containing the constant C1 and the variable R, the second unit STBb deciphers the first constant C1 with its specific key Kb in order to obtain the corresponding local key KLb. The file LClab provides the transcoding key TK=[KI] KLb which is then deciphered with the local key KLb obtained before. The result gives the intermediate key KI, which is necessary to decipher the variable R=[CK]KI in order to obtain the content key CK allowing the second unit STBb to decipher the content and to play it in clear.

An advantage of this method is that in both embodiments the unique keys specific to the processing units are not transmitted during the recording or the restoring on any unit depending on a same central server. They are neither stored in the files accompanying the ciphered content data.

The second embodiment can be preferred because it offers a higher security level due to the fact that the unique keys (Ka, Kb) specific to each processing unit (STBa, STBb) are not stored in the secondary server S2 in their original form as in the respective chipsets of each unit (STBa, STBb). However, the server stores the local keys (KLa, KLb) of each unit, which are such that ciphered by the keys (Ka, Kb) specific to the corresponding processing units (STBa, STBb) the first constant C1 is obtained. In the example illustrated by FIGS. 2 and 4, the constant C1 is equal to [KLa]Ka and [KLb]Kb.

The operations for calculating the content key CK during its restoration by the second unit STBb are also carried out by the chipset of this unit.

In the embodiment where one or several supplementary constants or variables have been used during the recording process, the transcoding key TK is calculated by successive deciphering of these constants or variables from the second constant C2 with the local key KLa of the unit STBa to obtain the final intermediate key KI' that will be ciphered with the local key KLb of the second unit STBb.

The invention claimed is:

1. A method of operating by a second processing unit a content recorded by a first processing unit, said first and second processing units having each a specific key being managed by a central server, the processing units having access to a removable storage memory intended to record the content ciphered by a content key and also data associated to said content, the content key being produced according to steps a to d or d' as follow:

a) deciphering, by the key specific to the first processing unit, a first constant provided by the central server for obtaining a first local key, b) deciphering a second constant provided by the central server with the first local key, obtaining an intermediate key, c) obtaining a variable by the first processing unit, d) ciphering the contents with a content key obtained by deciphering the variable with the intermediate key, storing in the storage memory the ciphered content, the first and second constants and the variable, or d') ciphering the content with a content key equal to the variable, storing in the storage memory the ciphered content, the first and second constants and the variable ciphered with the intermediate key, restoring by the second processing unit the content ciphered with the content key produced according to steps a, b, c and d or d', the following steps being previously carried out by the central server:

1) obtaining the first local key by the central server, the first local key being such that when ciphered by the key specific to the first processing unit, the first constant is obtained, 2) obtaining a second local key by the central server, the second local key being such that when ciphered by the key specific to the second processing unit, the first constant is obtained, 3) calculating a transcoding key by deciphering the second constant by the first local key then by ciphering the result by the second local key, 4) sending the transcoding key to the second processing unit, and according to the following steps carried out by the second processing unit, A) deciphering by the key specific to the second processing unit, the provided first constant for obtaining the second local key, B) deciphering the transcoding key with the second local key to obtain the intermediate key, C) deciphering the variable by the intermediate key to obtain the content key, D) deciphering the content with the content key and restoring the content by the second processing unit.

2. The method according to claim 1 wherein the specific keys of the first and second processing units are stored in the central server, the first and second local keys being obtained by the central server through the following steps:

1') calculation of the first local key by deciphering the first constant with the specific key of the first unit, 2') calculation of the second local key by deciphering the first constant with the specific key of the second unit.

3. The method according to claim 1 wherein the variable is a random number generated by the first processing unit.

4. The method according to claim 1 wherein the variable is a number extracted from a list stored in the first processing unit.

5. The method according to claim 1 wherein the variable is a random number generated by the central server and made available to the first processing unit.

6. The method according to claim 1 wherein the variable is a number extracted from a list stored in the central server and made available to the first processing unit.

7. The method according to claim 1 wherein the variable presents a different value at each recording of content by the first processing unit.

8. The method according to claim 1, further comprising, between steps b and c, at least one additional derivation of the intermediate key by deciphering of at least one constant or a supplementary variable by the intermediate key for obtaining a derived intermediate key, and wherein in step 3 the transcoding key is calculated by a deciphering of at least one constant or supplementary variable from the second constant with the local key of the first unit to obtain a final intermediate key, said final intermediate key being ciphered by the second local key.

9. The method according to claim 1 wherein the operations of steps a, b, c and d or d' of producing the content key during the recording of content by the first unit and the operations of steps A to C of obtaining the content key during the restoration of the content by the second unit are carried out by the respective chipsets of the first and the second units.

10. The method according to claim 1 wherein the ciphering/deciphering operations are carried out by using a symmetrical key algorithm.

11. The method according to claim 1 wherein, during the recording, first and second constants and variable or first and second constants and variable ciphered with the intermediate key are stored in a file accompanying the ciphered content.

12. The method according to claim 11 wherein the central server transmits the transcoding key in a transfer file, the file containing the constants and the variable and the transfer file being made available to the second unit during restoration of the content.

13. The method according to claim 11 wherein the file containing the constants and the variable is ciphered by a key of a security module associated to the processing unit.

14. The method according to claim 1, wherein the processing units are Pay-TV decoders or set top boxes equipped with a security module and managed by a central server, said units having access to removable storage media able to record a ciphered content intended to be restored by the same unit or a unit different from the one that has recorded the content.

15. The method according to claim 1, characterized in that the processing units are personal computers equipped with an internal or external security module and managed by a central server, said units having access to removable storage media able to record a ciphered content intended to be restored by the same unit or a unit different from the one that has recorded the content.

* * * * *